Figure 1:
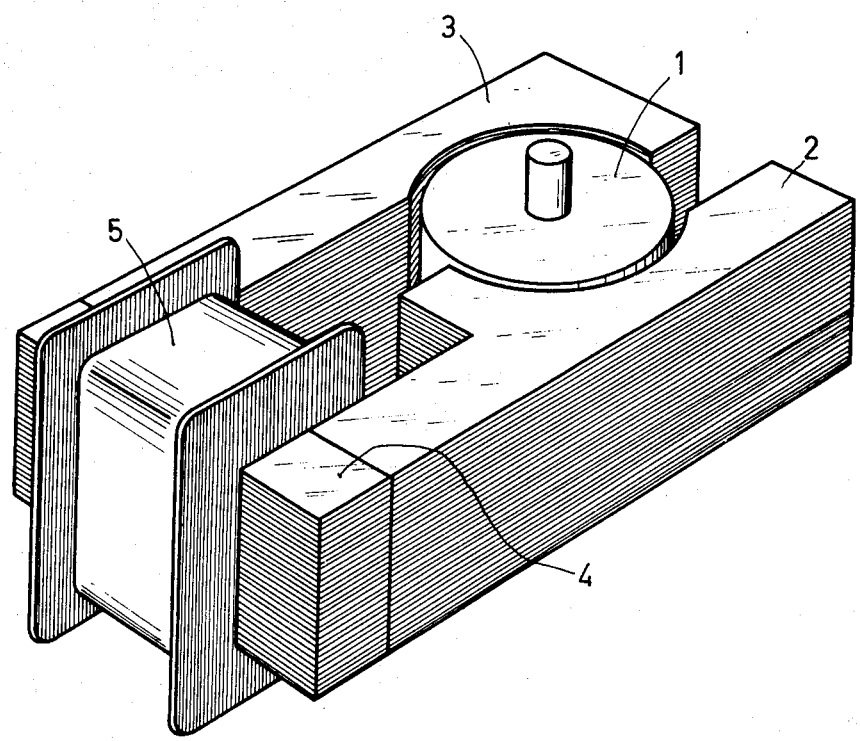

United States Patent

Thees

[15] 3,675,059
[45] July 4, 1972

[54] SELF STARTING SYNCHRONOUS MOTOR HAVING MEANS FOR REDUCING NEGATIVE TORQUE TO PRODUCE STABLE NO-LOAD ROTATION

[72] Inventor: Richard Thees, Aachen, Germany
[73] Assignee: U.S. Philips Corporation, New York, N.Y.
[22] Filed: Oct. 8, 1965
[21] Appl. No.: 494,066

[30] Foreign Application Priority Data

Oct. 15, 1964   Germany..............................N 25680

[52] U.S. Cl..............................................310/156, 310/62
[51] Int. Cl. .......................................................H02k 21/12
[58] Field of Search................310/42, 46, 47, 156, 162–164, 310/179–180, 191–193; 318/165–166, 184, 190, 214, 243, 360, 429, 491, 538; 336/87, 132–135

[56] References Cited

UNITED STATES PATENTS

| | | | |
|---|---|---|---|
| 2,245,433 | 6/1941 | Delmonte | 310/42 |
| 2,473,839 | 6/1949 | Altfather | 310/46 |
| 2,492,435 | 12/1949 | Ostline | 310/46 |
| 2,821,675 | 1/1958 | Ostenso | 310/46 |
| 2,867,762 | 1/1959 | Lehman et al. | 310/46 |
| 3,375,384 | 3/1968 | Thees | 310/156 |
| 597,418 | 1/1898 | Johnson | 310/191 X |
| 1,390,319 | 9/1921 | Warren | 318/165 X |
| 1,650,851 | 11/1927 | Rosenberg | 310/191 |
| 2,131,436 | 9/1938 | Howell | 310/156 |
| 2,601,517 | 6/1952 | Hammes | 310/162 X |
| 2,774,057 | 12/1956 | Jones | 340/195 |
| 2,981,855 | 4/1961 | Van Lieshout et al. | 310/163 |
| 3,046,449 | 7/1962 | Alley et al. | 336/133 X |
| 3,014,141 | 12/1961 | Riggs | 310/156 |
| 1,943,464 | 1/1934 | Von Ohlsen et al. | 323/56 |
| 2,214,850 | 9/1940 | Arey | 310/163 |
| 2,955,230 | 10/1960 | Ett | 323/56 X |

*Primary Examiner*—D. F. Duggan
*Attorney*—Frank R. Trifari

[57] ABSTRACT

A synchronous motor having a permanent magnet rotor of the type that is self-starting by vibration. A more stable no-load rotation of the motor is achieved by providing means for reducing the negative portions of the instantaneous torque produced by the motor. The above object is obtained in one embodiment of the invention by choosing the dimensions of the stator so that the stator iron is saturated under no-load conditions of the motor.

9 Claims, 4 Drawing Figures

INVENTOR.
RICHARD THEES

BY
AGENT

SELF STARTING SYNCHRONOUS MOTOR HAVING MEANS FOR REDUCING NEGATIVE TORQUE TO PRODUCE STABLE NO-LOAD ROTATION

The present invention relates to a synchronous motor having a permanent magnet rotor and of the type that is self-starting by vibration. The motor to be described is an improvement over the self-starting synchronous motor described in U.S. Pat. No. 2,601,517. A single-phase synchronous motor has a torque which vibrates around a mean value. The amplitude of the vibration is always equal to or larger than the mean value. Mean value and amplitude are equal only when the pull-out torque is substantially larger than under no-load conditions. As a result, under no-load conditions, negative torques are produced periodically which oppose the stable direction of rotation and tend to decelerate the rotor. As a result of these periodic oppositely directed torques, vibrations are produced which make the no-load rotation unstable and sometimes cause the motor to stall.

According to the invention, this drawback is overcome by distorting the current through the stator coil and/or the induced e.m.f. therein and/or the sticking torque, so that the negative part of the instantaneous torque is considerably reduced.

This distortion can be obtained with various means.

According to one embodiment of the invention, the supply current of the motor is derived from a transformer which is arranged to saturate at the no-load current of the motor.

In this case, when the supply current of the motor is distorted, a stable no-load rotation is guaranteed, it is true, but the losses increase as a result of the saturation of the transformer when the load of the motor increases because the current consumption of the motor increases.

Alternatively, a stable no-load rotation is also obtained when, according to a further embodiment of the invention, the motor is magnetized so that the radial component of the magnetic induction of the rotor magnet is distorted so that it does not vary cosinusoidally about its circumference. This distortion can be achieved by flattening the peaks of the otherwise cosinusoidal radial magnetization of the rotor to produce a flat topped magnetization distribution therein. The optimum distortion can readily be determined empirically.

The losses occurring as a result of the distortion of the e.m.f. induced in the stator coil by the rotor flux are independent of the load.

According to a very favorable embodiment of the invention, at least part of the stator iron is proportioned so that said part is saturated under no-load conditions.

As a result of the stator saturation, the current through the coil, the induced e.m.f. and the sticking torque are distorted so that a particularly stable no-load rotation is obtained. Since the magnetic flux through the stator iron is composed vectorially of the coil field and rotor field, the saturation in this arrangement decreases more and more as the motor is loaded due to the increasing load angle and the decreasing phase angle of the supply current, and is negligible at the pull-out torque. Therefore, as the load increases, the load angle also increases. In turn, the phase angle between the rotor flux and the main stator flux increases, the saturation decreases and additional energy is transferred under load conditions. The stronger the saturation effect at the normal supply voltage, the larger the under voltage may be at which a stable no-load rotation is still obtained. The required under voltage at which the motor will still operate, can also be obtained by suitably proportioning the part of the stator which is saturated under no-load conditions.

Figure 4:
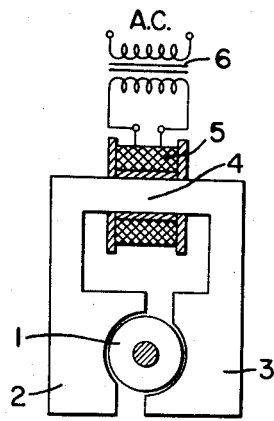
Figure 2:
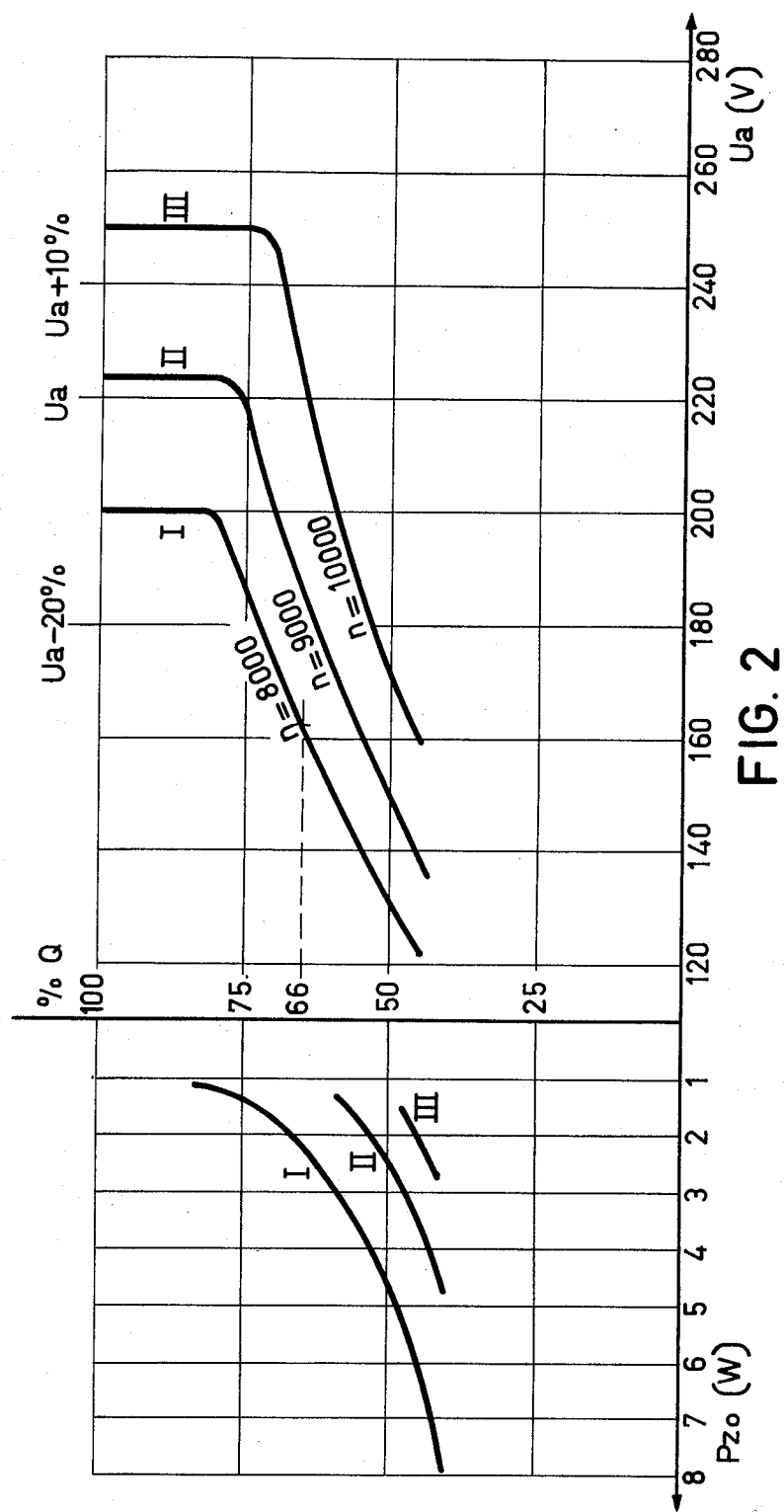
Figure 3:
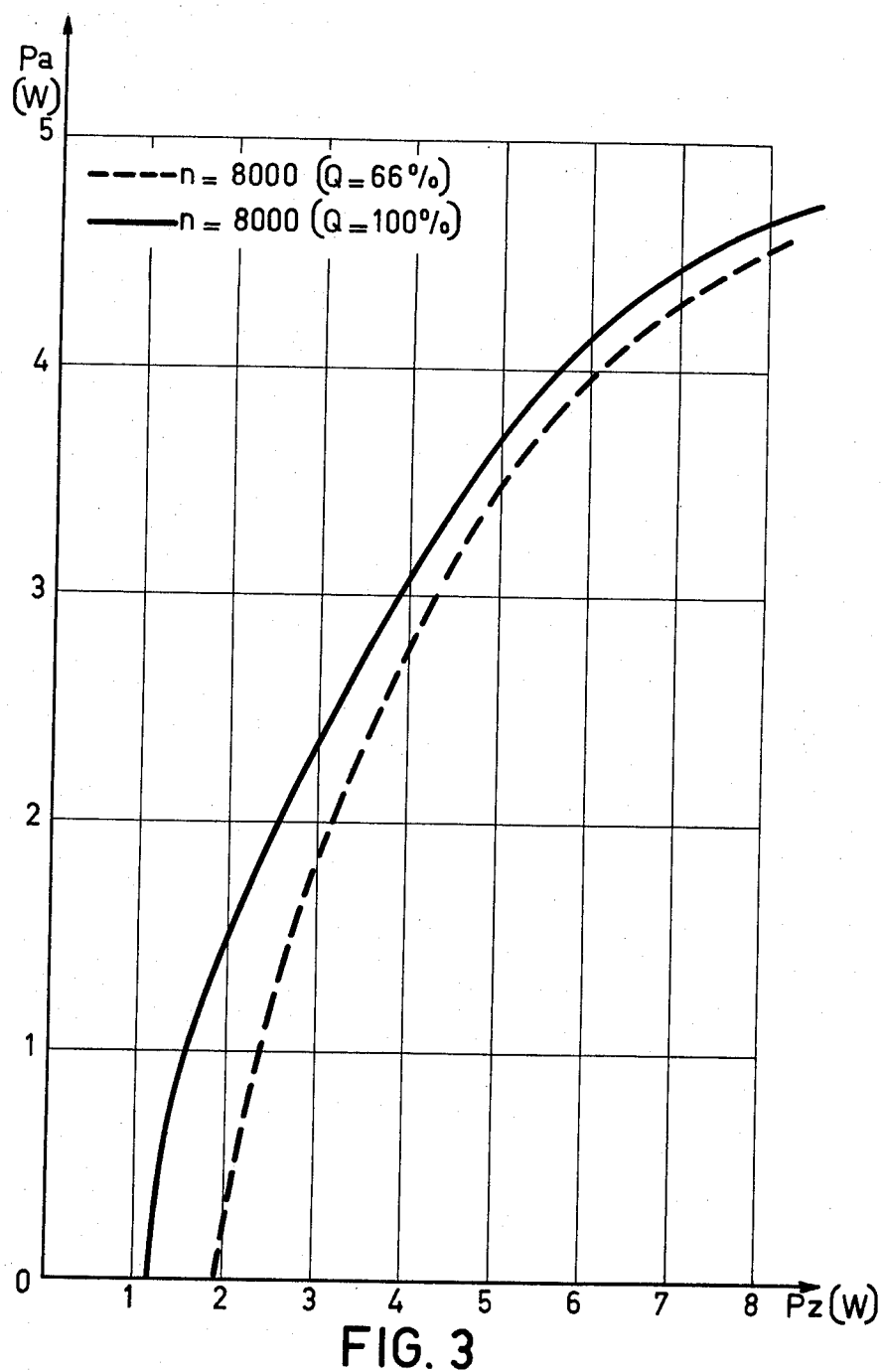

In order that the invention may readily be carried into effect, one embodiment thereof will now be described in greater detail, by way of example, with reference to the accompanying drawings, in which:

FIG. 1 shows a synchronous motor with a permanent magnetic rotor,

FIG. 2 is a graphical representation in which the iron cross-section of the stator iron is plotted as a function of the lower limit of the supply voltage $U_a$ at which a stable no-load rotation still takes place, and as a function of the consumed no-load power $Pz_o$, FIG. 3 is a graph showing the supplied power $Pa$ as a function of the loss power $Pz$ for a saturated and unsaturated stator, and FIG. 4 schematically shows a second embodiment of the motor.

FIG. 1 shows a synchronous motor of the general type described in an article by Richard Thees at pages 143–147 of the Philips Technical Review, Vol. 26, 1965, which starts by vibration. A permanent magnet rotor 1 having a radial component of magnetic induction is rotatably arranged between two asymmetrical limbs 2 and 3 of the stator. A yoke provided with a coil 5 is arranged against the ends of the limbs 2 and 3 remote from the rotor. The stator coil has a pair of input terminals 7 that are connected to the AC supply voltage 8. The yoke 4 is constructed so that its cross-section can be reduced arbitrarily by removing any number of sheets of which the yoke is composed. If the stator limbs were symmetrical, and with the stator coil deenergized, the rotor would assume a position with respect to the stator limbs such that a maximum magnetic flux would pass through the winding. In any other position, the rotor will experience a restoring torque that tends to turn it to the position of maximum magnetic flux. Thus, the rotor has two stable rest positions 180° apart. If the stator coil is energized from an AC supply voltage, a unidirectional sinusoidally varying field is produced. This field has the same direction as the magnetic induction in the rotor so that there is no starting torque. The rotor must be rotated out of its rest position to develop a starting torque to produce rotation. By utilizing an asymmetric stator configuration, the rotor assumes a rest position, with the stator coil deenergized, in which its magnetic induction is at a slight angle with respect to the stator field. Upon energization, the stator field will now exert a torque on the rotor in the rest position, whereby a rocking motion is produced which quickly builds in amplitude until the rotor swings itself into synchronous rotation. This type of motor will start successfully, but is unstable in operation at no-load.

As discussed in the above cited article in the Philips Technical Review, the total torque is composed of two components. The first torque component is the above described restoring torque or sticking torque, which is always present, even when the motor is deenergized. This torque has a mean value of zero. The second component of torque is the driving torque exerted on the rotor due to the interaction between the rotor field and the stator field. This torque periodically varies about a mean value that is greater than zero. The amplitude of this varying torque is greater than the mean value so that the driving torque exhibits a positive portion during the greater part of a cycle, and a negative portion during the remainder of the cycle which tends to decelerate the rotor. As a result of the periodic negative torques produced, the no load rotation is unstable so that it is even possible for the motor to reverse its direction of rotation. This instability is further increased by the sticking torque, which also exhibits a negative portion. This effect is illustrated by the torque curves in FIG. 3a of the above cited Philips Technical Review article.

If the maximum and minimum values of the resultant torque are decreased, the negative part of the torque can be reduced to a negligible value. This can be accomplished by reducing the maximum and minimum values of the stator flux and/or the rotor flux, as discussed above in the preamble. A first method is to dimension the cross-section of a part of the stator core so that saturation occurs under no-load conditions. A second method is to supply current to the stator coil by means of an iron core transformer which is arranged to saturate at the no load current of the motor. The third method is to magnetize the rotor so that the maxima and minima of the radial component of the induction along the circumference of the rotor are reduced, i.e. by distorting the radial component of the rotor induction as a function of the distance along its circumference. In this case, not only is the maximum and minimum value of the driving torque reduced, but also of the sticking torque.

It is known that the resultant stator flux, composed of the rotor flux and the stator coil flux, of a synchronous motor of the type described, decreases as the load on the motor is increased. This can be shown by means of the well known vector diagram for this type of motor, which can be found in numerous handbooks. It is therefore obvious that if the stator core is dimensioned to produce saturation for the no-load stator flux, and since this flux decreases as the load increases, then the stator saturation also must decrease as the load increases.

FIG. 2 shows, on the right-hand side, the percentage of the maximum iron cross-section of the yoke 4 as a function of the lower limit of the motor supply voltage U$a$ at which a stable no-load rotation takes place, and, on the left-hand side, as a function of the consumed no-load power P$zo$. As appears from this graph, the lower limit of the supply voltage initially remains constant until the stator is saturated. When the iron cross-section is further reduced, the lower limit of the supply voltage at which a stable no-load rotation takes place decreases constantly to a voltage which corresponds approximately to the induced e.m.f. in the stator coil. When the voltage is lower than the latter supply voltage, a stable no-load rotation is impossible, although the motor, when loaded, changes to a stable rotation. It is also clear from the curves in FIG. 2 that the degree of magnetic saturation of the stator iron at no-load is not critical in order to achieve the improved, i.e. more stable, no-load operation described above. In other words, a wide variation in the saturation characteristics of the stator iron is possible without affecting the inherent design stability of the motor.

From this Figure a further advantage of the invention may be seen. As is known, a motor in which the value of the induced e.m.f. approaches that of the supply voltage has a high efficiency with a small load. The invention provides the possibility of manufacturing motors which have a stable no-load rotation with a higher induced e.m.f. at the required under voltage and consequently a high efficiency in the operating range. This can be achieved by a suitable choice of the number of turns $n$ of the coils and of the iron cross-section Q of the stator. The number of turns $n$ in the associated curves I, II and III was in the proportion of 8 : 9 : 10. It may be seen from the left-hand graph that the no-load losses increase when the saturation increases.

FIG. 3 shows that the reduction of the iron cross-section Q with equal supply voltage results in an increase of the no-load losses P$z$, it is true, but below full load the consuming power P$a$ is hardly different. The two curves relate to curve I of FIG. 2.

FIG. 4 shows a second embodiment of the invention that is somewhat similar to that shown in FIG. 1. Accordingly, the same reference numerals have been used in FIG. 4 to identify corresponding parts of the motor. In FIG. 4, the input terminals of transformer 6 are connected to a single phase source of alternating current. The secondary winding of transformer 6 is connected to the stator winding 5. The transformer has an iron core that is designed to saturate at the no-load current of the motor, thereby producing a stable no-load rotation for the motor by suitably distorting the motor supply current. In this embodiment, it is not necessary to dimension the stator core to produce saturation therein at the no-load current of the motor.

What is claimed is:

1. A synchronous motor of the type that is self-starting solely by vibration comprising, a stator composed of magnetic material, a stator winding mounted thereon and having input terminals connected to a source of AC supply voltage thereby to produce a magnetic field in said stator, a permanent magnet rotor having an external magnetic field and operatively positioned relative to said stator so that a torque is produced by the interaction of the stator and rotor magnetic fields, said torque being variable periodically during the rotation of the rotor and exhibiting instantaneous positive and negative portions, and means coupled to the input terminals for distorting the waveform of the AC supply current applied to said input terminals at the no-load value of the motor current thereby distorting one of said fields so as to reduce said negative portion of the instantaneous torque.

2. A motor as described in claim 1 wherein said current distorting means comprises a transformer interconnecting said source of AC voltage with said input terminals, said transformer having a ferromagnetic core arranged to saturate at the no-load current of the motor.

3. A synchronous motor of the type that is self-starting solely by vibration comprising: a stator composed of magnetic material, a stator winding mounted thereon and having input terminals for connection to a source of AC voltage, a permanent magnet rotor operatively positioned relative to said stator so that a torque is produced which varies periodically during the rotation of the rotor and exhibits instantaneous positive and negative portions, the dimensions of a part of the magnetic stator being proportioned so that saturation occurs therein under no-load conditions of the motor thereby to distort the stator winding induced e.m.f. and reduce said negative portion of said instantaneous torque.

4. A synchronous motor of the type that is self-starting solely by vibration comprising, a stator including first and second confronting limbs arranged to accommodate a rotor therebetween and a yoke member interconnecting one end of said limbs and composed of a plurality of iron laminations, a stator winding mounted thereon and having input terminals for connection to a source of AC voltage, the cross-section of said yoke member being adjustable by removing one or more of said iron laminations, and a permanent magnet rotor rotatable in the space between said stator limbs and experiencing a torque that has instantaneous positive and negative portions, the number of laminations of said yoke being chosen so that the yoke member is saturated under no-load conditions of the motor.

5. A single phase synchronous motor comprising, a stator composed of magnetic material and including two spaced pole pieces arranged to provide an air gap, a stator winding mounted on said stator, a permanent magnet rotor mounted to rotate in said air gap, a part of said stator being dimensioned so that saturation occurs therein under no-load conditions of the motor, and means for energizing said stator winding with single phase AC energy at a voltage level such that the stator is magnetically saturated under no-load conditions of the motor and the stator saturation is decreased as the load on the motor is increased.

6. A motor as described in claim 5 wherein said rotor comprises a cylinder having a radial component of magnetic induction and said stator pole pieces are asymmetrically shaped.

7. A single phase synchronous motor comprising, a stator composed of magnetic material and including two spaced pole pieces arranged to provide an air gap, a stator winding mounted on said stator, a permanent magnet rotor mounted to rotate in said air gap, a source of sinusoidal alternating current, and a transformer having a ferromagnetic core interconnected between said AC source and said stator winding and arranged to saturate at the no-load current of the motor thereby to supply a non-sinusoidal AC current to said stator winding.

8. A single phase synchronous motor comprising, a stator composed of magnetic material and including two spaced pole pieces arranged to provide an air gap, a stator winding mounted on said stator, a permanent magnet rotor mounted to rotate in said air gap, and a source of sinusoidal alternating current coupled to said stator winding, a part of said stator being dimensioned so that saturation occurs therein under no-load conditions of the motor and the saturation is decreased as the load on the motor is increased.

9. A motor is described in claim 8 wherein said rotor comprises a ferrite cylinder that is diametrically magnetized and said stator pole pieces are asymmetrically shaped.

* * * * *